United States Patent
Yoo et al.

(10) Patent No.: US 10,934,443 B2
(45) Date of Patent: Mar. 2, 2021

(54) INFRARED TRANSMITTING INK COMPOSITION FOR INK JET, METHOD FOR FORMING BEZEL PATTERN BY USING SAME, BEZEL PATTERN FORMED THEREBY, AND DISPLAY SUBSTRATE COMPRISING SAME

(71) Applicant: LG Chem, Ltd., Seoul (KR)

(72) Inventors: Jaehyun Yoo, Daejeon (KR); Areum Kim, Daejeon (KR); Sungeun Park, Daejeon (KR); Joonhyung Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/472,400

(22) PCT Filed: Aug. 8, 2018

(86) PCT No.: PCT/KR2018/009041
§ 371 (c)(1),
(2) Date: Jun. 21, 2019

(87) PCT Pub. No.: WO2019/035595
PCT Pub. Date: Feb. 21, 2019

(65) Prior Publication Data
US 2019/0359838 A1    Nov. 28, 2019

(30) Foreign Application Priority Data

Aug. 18, 2017 (KR) .................. 10-2017-0104616
Jul. 20, 2018 (KR) .................. 10-2018-0084684

(51) Int. Cl.
| | | |
|---|---|---|
| C09D 11/322 | (2014.01) | |
| C09D 11/326 | (2014.01) | |
| C09D 11/033 | (2014.01) | |
| C09D 11/037 | (2014.01) | |
| C09D 11/101 | (2014.01) | |
| B41J 11/00 | (2006.01) | |
| C09D 11/36 | (2014.01) | |
| C09D 11/38 | (2014.01) | |
| C09D 11/102 | (2014.01) | |

(52) U.S. Cl.
CPC ........... C09D 11/037 (2013.01); B41J 11/002 (2013.01); C09D 11/033 (2013.01); C09D 11/101 (2013.01); C09D 11/102 (2013.01); C09D 11/326 (2013.01); C09D 11/36 (2013.01); C09D 11/38 (2013.01)

(58) Field of Classification Search
CPC ... C09D 11/322; C09D 11/326; C09D 11/033; C09D 11/037; C09D 11/101; B41J 11/002; G03F 7/038; G03F 7/004
See application file for complete search history.

(56) References Cited

U.S. PATENT DOCUMENTS

| | | | |
|---|---|---|---|
| 9,341,946 B2 | 5/2016 | Park et al. | |
| 2005/0113476 A1* | 5/2005 | Akiyama | C09D 11/101 522/1 |
| 2008/0045618 A1* | 2/2008 | Nagvekar | C08F 290/06 522/27 |
| 2012/0077896 A1* | 3/2012 | Ishima | B41M 5/0047 522/75 |
| 2013/0176369 A1* | 7/2013 | Gotou | C09D 11/40 347/100 |
| 2013/0177719 A1 | 7/2013 | Tasaka et al. | |
| 2015/0004374 A1 | 1/2015 | Nahm et al. | |
| 2015/0018447 A1* | 1/2015 | Son | C08G 59/687 522/71 |
| 2015/0125789 A1* | 5/2015 | Park | G03F 7/0385 430/18 |
| 2015/0293282 A1* | 10/2015 | Takishita | G01J 5/0803 359/359 |
| 2016/0068695 A1* | 3/2016 | Suzuki | C09D 4/00 347/102 |
| 2017/0198157 A1 | 7/2017 | Park et al. | |
| 2017/0298241 A1 | 10/2017 | Park et al. | |

(Continued)

FOREIGN PATENT DOCUMENTS

| | | |
|---|---|---|
| JP | 2010013596 A | 1/2010 |
| JP | 2017014439 A | 1/2017 |

(Continued)

OTHER PUBLICATIONS

Search report from International Application No. PCT/KR2018/009041, dated Dec. 5, 2018.
JEFFSOL Alkylene Carbonates, Huntsman Corporation, 2001 [retrieved on Oct. 18, 2018]. Retrieved from the internet: <URL: http://www.huntsman.com/performance_products/Media%20Library/global/files/jeffsol_alkylene_carbonates_brochure.pdff>.

*Primary Examiner* — Matthew Luu
*Assistant Examiner* — Kendrick X Liu
(74) *Attorney, Agent, or Firm* — Lerner, David, Littenberg, Krumholz & Mentlik, LLP

(57) ABSTRACT

Disclosed are an infrared transmitting ink composition for an ink jet, a method for forming a bezel pattern by using the same, a bezel pattern formed thereby, and a display substrate comprising the same, wherein the infrared transmitting ink composition enables the check of align markers through an infrared camera and the detection of pressure marks through non-destructive inspection even after the bezel pattern is printed on the display substrate, has excellent storage stability, curing sensitivity, and adhesion with a basic material, and can improve an ink jet process performance. The infrared transmitting ink composition for an ink jet comprises: a lactam black pigment, a perylene black pigment, or a combination thereof; a dispersant; an epoxy compound; an oxetane compound; a photo-polymerization initiator; and an organic solvent.

16 Claims, No Drawings

(56) References Cited

U.S. PATENT DOCUMENTS

| | | |
|---|---|---|
| 2018/0100076 A1 | 4/2018 | Lakrout et al. |
| 2018/0275787 A1 | 9/2018 | Yoo et al. |
| 2019/0218396 A1* | 7/2019 | Ishikawa ................. C08K 3/36 |
| 2019/0258164 A1* | 8/2019 | Tanigaki ............. H01L 27/3246 |

FOREIGN PATENT DOCUMENTS

| | | |
|---|---|---|
| KR | 20130016460 A | 2/2013 |
| KR | 101323562 B1 | 10/2013 |
| KR | 20150106386 A | 9/2015 |
| KR | 20160037121 A | 4/2016 |
| KR | 20160037123 A | 4/2016 |
| KR | 20160071336 A | 6/2016 |
| KR | 20170062314 A | 6/2017 |
| KR | 20180039556 A | 4/2018 |
| WO | 2016153894 A1 | 9/2016 |

\* cited by examiner

INFRARED TRANSMITTING INK
COMPOSITION FOR INK JET, METHOD
FOR FORMING BEZEL PATTERN BY USING
SAME, BEZEL PATTERN FORMED
THEREBY, AND DISPLAY SUBSTRATE
COMPRISING SAME

CROSS-REFERENCE TO RELATED
APPLICATIONS

This application is a national phase entry under 35 U.S.C. § 371 of International Application No. PCT/KR2018/009041, filed Aug. 8, 2018 which claims priority to Korean Patent Application No. 10-2017-0104616, filed Aug. 18, 2017, and Korean Patent Application No. 10-2018-0084684, filed Jul. 20, 2018, the disclosures of which are incorporated herein by reference.

BACKGROUND OF THE INVENTION

1. Field of the Invention

The present invention relates to an infrared transmitting ink composition for inkjet, a method for forming a bezel pattern using the same, a bezel pattern manufactured thereby, and a display substrate comprising the same. More specifically, it relates to an infrared transmitting ink composition for inkjet, which enables to check alignment marks using an infrared camera and detect pressure marks by non-destructive inspection even after a bezel pattern is printed on a display substrate and enables to improve storage stability, curing sensitivity and the adhesion to the substrate and the performance of inkjet process, a method for forming a bezel pattern using the same, a bezel pattern manufactured thereby, and a display substrate comprising the same.

2. Description of the Related Art

Display devices such as TVs and mobile devices including smart phones, are being developed day by day in terms of originality and convenience. Along with this growth, there are also many demands and problems to be solved for improved convenience, and studies for solving these problems have been continuing. Among them, as a solution for improving the user's degree of immersion in screen, a narrow bezel which reduces unnecessary edges to secure a more extended screen is applied. As a result, a casing for a display panel becomes unnecessary, and research has been continued to hide the electrodes outside the display area of display device and to further reduce the visual difference between the display area and the non-display area. In addition, development of the ink which enables to improve storage stability and excellent curing sensitivity and exhibit excellent adhesion to the substrate and to improve the performance of inkjet process is also desired.

PRIOR ART DOCUMENT

Patent Literature (Patent Document 1) Korean Patent Laid-open Publication No. 10-2013-0016460

As described above, in order to apply a narrow bezel for securing a more extended screen of the display device, studies for development of inks has been continued to hide the electrodes outside the display area of display device, to further reduce the visual difference between the display area and the non-display area, to improve storage stability and curing sensitivity, to exhibit excellent adhesion to the substrate and to improve the performance of inkjet process.

As a result of such studies, various ink compositions have been developed. However, in case of a black ink containing carbon black, there is a problem in that printing is possible only after removing alignment marks for a post-process and testing of the sample is possible only after the sample is destroyed in order to detect pressure marks generated in the ACF bonding process. Further, in case of most of the inks, it is disadvantageous that the ink can be adhered to the substrate only after a post-process in which the heat treatment is performed.

SUMMARY OF THE INVENTION

It is therefore an object of the present invention to provide an infrared transmitting ink composition for inkjet, which enables to check alignment marks using an infrared camera and to detect pressure marks by non-destructive inspection after the ACF bonding, even after a bezel pattern is printed on a display substrate, a method for forming a bezel pattern using the same, a bezel pattern manufactured thereby, and a display substrate comprising the same.

It is another object of the present invention to provide an infrared transmitting ink composition for inkjet, which improves storage stability, has excellent curing sensitivity and excellent adhesion to the substrate and can improve the performance of inkjet process, a method for forming a bezel pattern using the same, a bezel pattern manufactured thereby, and a display substrate comprising the same.

In order to achieve the above object, the present invention provides an infrared transmitting ink composition for inkjet, comprising a lactam black pigment or perylene black; a dispersant; an epoxy compound; an oxetane compound; a photopolymerization initiator; and an organic solvent.

Further, the present invention provides a method for forming a bezel pattern using the infrared transmitting ink composition for inkjet, comprising the steps of: a) forming a bezel pattern by inkjet printing the infrared transmitting ink composition for inkjet on a substrate; and b) curing the bezel pattern by irradiation with radiation.

The present invention also provides a bezel pattern manufactured by the method of forming a bezel pattern.

The present invention also provides a display substrate comprising the bezel pattern.

Using the infrared transmitting ink composition for inkjet according to the present invention, the method for forming a bezel pattern using the same, the bezel pattern manufactured thereby, and the display substrate comprising the same, it is possible to check alignment marks using an infrared camera even after a bezel pattern is printed on a display substrate and to detect pressure marks by a non-destructive inspection after ACF bonding, and also to improve storage stability, curing sensitivity, the adhesion to the substrate and the performance of inkjet process.

DETAILED DESCRIPTION OF THE
INVENTION

The present invention will now be described in detail.
The present invention may be subject to various modifications and may have various embodiments, and specific embodiments are to be exemplified. It is to be understood, however, that the intention is not to limit the invention to the particular embodiments, but to cover all modifications, equivalents, and alternatives falling within the spirit and scope of the invention. In the following description of the present invention, detailed description of known functions will be omitted if it is determined that it may obscure the gist of the present invention.

The infrared transmitting ink composition for inkjet according to the present invention comprises a lactam black pigment or a perylene black pigment or a combination thereof, a dispersant, an epoxy compound, an oxetane compound, a photopolymerization initiator and an organic solvent.

The lactam black pigment or a perylene black pigment as an infrared transmitting pigment is a coloring agent that determines the infrared transmittance of the coating layer formed by curing the ink composition according to the present invention. It is impossible to use pigments such as carbon black and aniline black because the transmittance is very low due to blocking light of all wavelengths (light-shielding property). In contrast, using the lactam black pigment or a perylene black pigment or a combination thereof, the transmittance at an infrared wavelength is excellent, and therefore, even when a bezel pattern is printed on a display substrate, alignment marks and pressure marks can be detected using non-destructive infrared ray sensor such as an infrared camera.

Examples of the perylene black pigments include, but are not limited to, Paliogen Black L 0086 (BASF, Germany) and Paliogen Black S 0084 (BASF, Germany).

The content of the infrared transmitting pigment is 5 to 15% by weight, preferably 10 to 12% by weight, more preferably about 12% by weight based on the total ink composition. When the content of the infrared transmitting pigment is less than 5% by weight with respect to the total ink composition, the light-shielding property of the bezel layer is lowered, so that electrodes of the non-display area may be visible. When the content of the lactam black pigment is more than 15% by weight, the viscosity of the ink may excessively increase, or the infrared ray transmittance may be lowered so that the function of the infrared ray sensor may be deteriorated.

Next, the dispersant is used to make the infrared transmitting pigment particles of uniform size, and also to reduce the production time of the ink. As the dispersant, a polymeric, nonionic, anionic or cationic dispersant may be used, Examples thereof include acrylics, polyalkylene glycols and esters thereof, polyoxyalkylene polyhydric alcohols, ester alkylene oxide adducts, alcohol alkylene oxide adducts, sulfonic acid esters, sulfonates, carboxylic acid esters, carboxylates, alkylamide alkylene oxide adducts, alkylamines and the like. These may be used alone or in admixture of two or more. Among them, it is preferable to use an acrylic-based dispersant having excellent storage stability of ink.

The content of the dispersant is 0.5 to 5% by weight, preferably 1 to 3% by weight, and more preferably about 2% by weight based on the total ink composition. When the content of the dispersant is less than 0.5% by weight, the pigment may not uniformly dispersed. When it exceeds 5% by weight, the pigment may be aggregated or the curing sensitivity may be lowered.

The epoxy compound is obtained by a cationic polymerization and may be one or a mixture of two selected from alicyclic epoxy compounds containing cationic polymerizable alicyclic epoxy monomers. Such an alicyclic epoxy compound may contain one or two epoxidized aliphatic cyclic groups, wherein the epoxidized aliphatic cyclic group may be, for example, a compound which has an epoxy group formed in an alicyclic ring and the hydrogen atom of the alicyclic ring may be substituted with a substituent such as an alkyl group.

Examples of the alicyclic epoxy compound, that is, the epoxy compound include dicyclopentadiene dioxide, limonene dioxide, (3,4-epoxycyclohexyl) methyl-3,4-epoxycyclohexanecarboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl)adipate, (3,4-epoxycyclohexyl)methyl alcohol, (3,4-epoxy-6-methylcyclohexyl)methyl-3,4-epoxy-6-methylcyclohexanecarboxylate, ethylene glycol bis(3,4-epoxycyclohexyl)ether, 3,4-epoxycyclohexene carboxylic acid ethylene glycol diester, (3,4-epoxycyclohexyl)ethyltrimethoxysilane and the like, but are not limited thereto.

The content of the epoxy compound is 5 to 25% by weight, preferably 7 to 15% by weight, and more preferably about 10% by weight based on the total ink composition. If the content of the epoxy compound is less than 5% by weight, the curing sensitivity is lowered. If it exceeds 25% by weight, the viscosity of the ink may increase so that the performance of inkjet process may be deteriorated.

The oxetane compound, which is a compound having a quaternary cyclic ether group in the molecular structure, is used for lowering the viscosity of the cationic polymerizable ink composition. Examples thereof include 3-ethyl-3-hydroxymethyl oxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, 3-ethyl-3-cyclohexyloxymethyl oxetane, phenol novolac oxetane and the like, and trade names of ARON OXETANE OXT-101, ARON OXETANE OXT-121, ARON OXETANE OXT-211, ARON OXETANE OXT-221 or ARON OXETANE OXT-212 available from Toagosei Co., Ltd., which may be used alone or in admixture of two or more.

The content of the oxetane compound is 25 to 50% by weight, preferably 30 to 45% by weight, and more preferably 34 to 40% by weight based on the total ink composition. If the content of the oxetane compound is less than 25% by weight, the viscosity of the ink may increase so that the performance of inkjet process may be deteriorated. If it exceeds 50% by weight, the curing sensitivity may be lowered.

The organic solvent may be used without particular limitation as long as it has excellent curing sensitivity even after the bezel pattern is printed on the display substrate using the ink composition according to the present invention. However, in order to improve the performance of inkjet process, it is preferable to use the organic solvent having a boiling point of 200° C. or more and a viscosity of 1 to 5 cP, preferably 3 cP or less at 25° C.

Thus, in case that the infrared transmitting pigment is contained in the total ink composition at a low content of less than 10% (especially 7% or less), there is no big problem in the performance of inkjet process even if an organic solvent such as ethylene glycol monobutyl ether acetate (BCsA) having a boiling point of less than 200° C. is used. However, if the above-mentioned infrared transmitting pigment is contained in a relatively high content of 10% or more, the performance of inkjet process is degraded.

Therefore, in the present invention, it is required to use an organic solvent which enables to enhance or improve the performance of inkjet process. The performance of inkjet process is improved as the use of an organic solvent satisfying the conditions of high boiling point and low viscosity as described above (having a boiling point of 200° C. or higher and a viscosity of 1 to 5 cP, particularly 3 cP or less at 25° C.). Therefore, an organic solvent satisfying such conditions, for example, butyl diglyme (or diethylene glycol dibutyl ether), dipropylene glycol methyl ether acetate, ethylene glycol dibutyrate, diethyl succinate, gamma-butyrolactone (GBL) and ethyl caprate should be used, and the butyl diglyme and diethyl succinate are most preferred.

The content of the organic solvent is 10 to 40% by weight, preferably 20 to 35% by weight and more preferably 25 to 35% by weight based on the total ink composition. If the content of the organic solvent is less than 10% by weight, the viscosity of the ink may increase or the thickness of the bezel layer may become thick. If it exceeds 40% by weight, the curing sensitivity may be lowered.

The photopolymerization initiator is a cationic polymerizable initiator. Specifically, the photopolymerization initiator is a compound generating cationic species or Bronsted acid by irradiation with ultraviolet rays and, for example, it comprises at least one of an iodonium salt and a sulfonium salt. The iodonium salt or the sulfonium salt may cause a curing reaction to form a polymer by reacting monomers having an unsaturated double bond contained in the ink during the ultraviolet curing process. For example, the photopolymerization initiator may include compounds having an anion represented by $SbF_6$—, $AsF_6$—, $BF_6$—, $(C_6F_5)_4$ B—, $PF_6$— or $Rf_nF_{6-n}$, but is not limited thereto. Commercially available products include Irgacure 250, Irgacure 270, Irgacure 290, CPI-100P, CPI-101A, CPI-210S, Omnicat 440, Omnicat 550 and Omnicat 650, etc. These photopolymerization initiators may be used alone or in combination of two or more. In particular, in one embodiment of the present invention, in order to improve the storage stability of the infrared transmitting ink composition for inkjet, the photopolymerization initiator may be a sulfonium salt, more preferably Omnicat 550.

The content of the photopolymerization initiator is 1 to 10% by weight, preferably 2 to 7% by weight, and more preferably 3 to 5% by weight based on the total ink composition. If the content of the photopolymerization initiator is less than 1% by weight, the curing reaction may be insufficient, and if it exceeds 10% by weight, it may not be completely dissolved or the viscosity of the ink may increase so that the performance of inkjet process may be deteriorated.

Meanwhile, the ink composition according to the present invention may further comprise at least one of a reactive diluent, an adhesion promoter, and a surfactant, if necessary.

The reactive diluent may be included to improve the performance of inkjet process by lowering the viscosity of the ink, and a glycidyl ether-based epoxy compound capable of cationic polymerization may be used. Examples of the glycidyl ether-based epoxy compound include N-butyl glycidyl ether, neopentyl glycol diglycidyl ether (LD203) and the like, and these may be used alone or in combination of two or more.

The content of the reactive diluent is preferably 0 to 30% by weight, more preferably 0.1 to 20% by weight based on the total weight of the ultraviolet curable ink composition. If it is more than 30% by weight, the curing sensitivity is lowered.

The adhesion promoter can improve adhesion between the substrate and the printed layer. The adhesion promoter may be at least one selected from the group consisting of an alkoxysilane compound and a phosphate-based acrylate such as phosphate acrylate. Examples of the alkoxysilane compound include 3-glycidoxypropyl trimethoxysilane (KBM-403 (Shin-Etsu Chemical Co., Ltd., USA)), 3-glycidoxypropyl methyldimethoxysilane (KBM-402), 2-(3,4-epoxycyclohexyl)ethyltrimethoxysilane (KBM-303), 3-glycidoxypropyl methyldiethoxysilane (KBE-402), 3-glycidoxypropyl triethoxysilane (KBE-403), 3-methacryloxypropyl trimethoxysilane (KBM-503) and the like, and these may be used alone or in combination of two or more.

In case that the adhesion promoter is used, the content thereof is 1 to 5% by weight, preferably 2 to 4% by weight based on the total ink composition. If the content of the adhesion promoter is less than 1% by weight, adhesion between the substrate and the printed layer may be deteriorated. If it exceeds 5% by weight, the operation (rework) of removing the printed layer on the substrate may become difficult.

The surfactant controls the surface tension of the ink so that jetting can be smoothly performed and the ink spreads properly in the substrate. Examples thereof include Megafack F-444, F-475, F-478, F-479, F-484, F-550, F-552, F-553, F-555, F-570 and RS-75 from DIC (DaiNippon Ink & Chemicals), or Surflon S-111, S-112, S-113, S-121, S-131, S-132, S-141 and S-145 from Asahi Glass Co., Ltd., or Fluorad FC-93, FC-95, FC-98, FC-129, FC-135, FC-170C, FC-430 and FC-4430 from Sumitomo 3M Co., Ltd., or Zonyl FS-300, FSN, FSN-100 and FSO from DuPont, or BYK-306, BYK-310, BYK-320, BYK-330, BYK-331, BYK-333, BYK-342, BYK-350, BYK-354, BYK-355, BYK-356, BYK-358N, BYK-359, BYK-361N, BYK-381, BYK-370, BYK-371, BYK-378, BYK-388, BYK-392, BYK-394, BYK-399, BYK-3440, BYK-3441, BYK-UV3500, BYK-UV3530, BYK-UV3570, BYKETOL-AQ, BYK-DYNWET 800, BYK-SILCLEAN 3700 and BYK-UV 3570 from BYK, or Rad 2100, Rad 2011, Glide 100, Glide 410, Glide 450, Flow 370 and Flow 425 from TEGO, etc. These may be used singly or in combination of two or more.

In case that the surfactant is included in the ink composition, the content thereof is 0.1 to 5% by weight and preferably 0.5 to 3% by weight based on the total ink composition. If the content of the surfactant is less than 0.1% by weight, the effect of lowering the surface tension of the composition is insufficient, and coating failure occurs when the composition is coated on the substrate. If it exceeds 5% by weight, the surfactant is used in an excessive amount, resulting in a problem that the compatibility and defoaming property of the composition is rather reduced.

The infrared transmitting ink composition (or ink) for inkjet according to the present invention has a dose for curing of 20 to 5,000 $mJ/cm^2$, preferably 100 to 3,000 $mJ/cm^2$ and is cured by absorbing radiation in the wavelength range of 250 to 410 nm, preferably 360 to 410 nm. Furthermore, in order to be suitable for an inkjet process, it has a viscosity of, for example, 1 to 30 cP at 25° C., preferably 2 to 20 cP at a processing temperature. The adhesive force to the substrate without the post-process (heat treatment) is 4B or more in the cross cut test.

Further, the infrared transmitting ink composition (or ink) for inkjet according to the present invention (or the ink) shows excellent storage stability, with a point of increasing the viscosity by more than 10% when stored at 35 degrees at 20 days or more, preferably more than 40 days, and more preferably at 60 days or more. And the infrared transmitting ink composition (or ink) for inkjet achieves excellent ink stability without precipitation of photoinitiating polymer after ink production.

As described above, the infrared transmitting ink composition for inkjet according to the present invention is curable at ultraviolet ray having a long wavelength, and has light transmittance similar to that of a conventional carbon black pigment. However, the use of a lactam black pigment or a perylene black pigment or the combination thereof having a transmittance of 80% or more at an infrared wavelength of 850 to 940 nm makes it possible to check the alignment marks using an infrared camera and to detect the pressure mark by non-destructive inspection even after the bezel pattern is printed on the display substrate.

However, in order to improve the light-shielding property lowered due to using the lactam black pigment, or the perylene black pigment or the combination thereof, the pigment is used in an amount of 10% by weight or more based on the total ink composition. But such amount of the pigment may deteriorate the performance of inkjet process. Therefore, in the present invention, in order to prevent this problem, an organic solvent satisfying a specific condition is used, which allows to improve the performance of inkjet process. In addition, by using the infrared transmitting ink composition for inkjet according to the present invention, the curing sensitivity of the ink is excellent as 2,000 $mJ/cm^2@1.8$ μm and the adhesive force to the substrate without the post-process (heat treatment) is excellent. Lastly, there is an advantage in that while the adhesion force to the substrate is excellent, the rework-ability of reusing the defective display panel by removing the printed bezel pattern is also excellent.

Next, a method of forming a bezel pattern using the infrared transmitting ink for inkjet composition according to the present invention will be described. The method for forming a bezel pattern using the infrared transmitting ink composition for inkjet comprises the steps of: a) forming a bezel pattern by inkjet printing the infrared transmitting ink composition for inkjet on a substrate; and b) curing the bezel pattern by irradiation with radiation. The thickness of the cured bezel pattern may be from 1 to 3 μm. A detailed description thereof is based on the above description of the ink composition and the method of forming a bezel pattern using a conventional cationic polymerization ink composition.

Furthermore, the present invention provides a bezel pattern manufactured by using the infrared transmitting ink composition for inkjet, or a bezel pattern produced according to the method of forming the bezel pattern.

The present invention also provides a display substrate comprising the bezel pattern. The display may be used in any one of a Plasma Display Panel (PDP), a Light Emitting Diode (LED), an Organic Light Emitting Diode (OLED), a Liquid Crystal Display (LCD), a Thin Film Transistor-Liquid Crystal Display (LCD-TFT) and a Cathode Ray Tube (CRT).

Hereinafter, preferred embodiments of the present invention will be described in order to facilitate understanding of the present invention. However, the following examples are provided for illustrative purposes only, and it will be apparent to those skilled in the art that various modifications and variations can be made in the present invention without departing from the spirit or scope of the inventions. Such changes and modifications are intended to fall within the scope of the appended claims.

Example 1

Preparation of Infrared Transmitting Ink Composition for Inkjet

As shown in Table 1 below, based on total weight of the total ink composition, 12% by weight of lactam black (trade name: S0100CF, BASF AG, Germany) as a pigment, 2% by weight of an acrylic-based dispersant as a dispersant, 10% by weight of Celloxide 2021p (DAICEL Corporation, Japan) as an epoxy compound, 34% by weight of OXT-221 (TOA-GOSEI Co., Ltd., Japan) as an oxetane compound, 5% by weight of N-butyl glycidyl ether (Hubei, China) as a diluent, 25% by weight of butyl diglyme and 6% by weight of gamma-butyrolactone (GBL) as organic solvents, 3% by weight of KBM-403 (Shin-Etsu Silicone, Japan) as an adhesion promoter, and 3% by weight of Omnicat 550 (IHT, China) as a photopolymerization initiator were mixed and stirred for 5 hours to prepare an infrared transmitting ink composition for inkjet.

Example 2

Preparation of Infrared Transmitting Ink Composition for Inkjet

As shown in Table 1 below, an infrared transmitting ink composition for inkjet was prepared using the same composition and method as in Example 1 except that diethyl succinate was used instead of butyl diglyme as the solvent.

Example 3

Preparation of Infrared Transmitting Ink Composition for Inkjet

As shown in Table 1 below, an infrared transmitting ink composition for inkjet was prepared using the same composition and method as in Example 1 except that the content of OXT-221 used as the oxetane compound was 39% by weight instead of 34% by weight and the content of butyl diglyme used as the solvent was 20% by weight instead of 25% by weight.

Example 4

Preparation of Infrared Transmitting Ink Composition for Inkjet

As shown in Table 1 below, an infrared transmitting ink composition for inkjet was prepared using the same composition and method as in Example 1 except that the content of lactam black used as the pigment was 10% by weight instead of 12% by weight and the content of OXT-221 used as the oxetane compound was 36% by weight instead of 34% by weight.

Example 5

Preparation of Infrared Transmitting Ink Composition for Inkjet

As shown in Table 1 below, an infrared transmitting ink composition for inkjet was prepared using the same composition and method as in Example 1 except that 12% by weight of perylene black was used.

TABLE 1

| Infrared transmitting ink composition for inkjet | | Example 1 | Example 2 | Example 3 | Example 4 | Example 5 |
|---|---|---|---|---|---|---|
| Black pigment | Lactam black | 12 | 12 | 12 | 10 | — |
|  | Perylene black | — | — | — | — | 12 |
| Dispersant | Acrylic-based | 2 | 2 | 2 | 2 | 2 |
| Epoxy compound | Celloxide 2021p | 10 | 10 | 10 | 10 | 10 |
| Oxetane compound | OXT-221 | 34 | 34 | 39 | 36 | 34 |
| Diluent | N-Butyl Glycidyl Ether | 5 | 5 | 5 | 5 | 5 |
| Organic solvent | Butyl diglyme | 25 | — | 20 | 25 | 25 |
|  | Diethyl Succinate | — | 25 | — | — | — |
|  | gamma-butyrolactone | 6 | 6 | 6 | 6 | 6 |
| Adhesion promoter | KBM-403 | 3 | 3 | 3 | 3 | 3 |
| Photopolymerization initiator | Omnicat 550 | 3 | 3 | 3 | 3 | 3 |

Celloxide 2021p: (3',4'-epoxycyclohexane)methyl 3,4-epoxycyclohexyl carboxylate
OXT-221: bis[1-ethyl (3-oxetanyl)]methyl ether
N-BUTYL GLYCIDYL ETHER
KBM-403: 3-glycidoxypropyl trimethoxysilane
Omnicat 550: 10-[1,1'-biphenyl]-4-yl-2-(1-methylethyl)-9-oxo-9H-thioxanthenium hexafluorophosphate

Comparative Example 1

Preparation of Ink Composition

As shown in Table 2 below, an ink composition was prepared using the same composition and method as in Example 1 except that 28% by weight of OXT-221 and 5% by weight of OXT-212 (TOAGOSEI, Japan) as the oxetane compounds, 10% by weight of 1,4-cyclohexanedimethanol divinyl ether as the diluent, 25% by weight of butyl diglyme as the organic solvent, 4% by weight of Irgacure 250 (BASF, Germany) as the photopolymerization initiator and 1% by weight of ITX (IHT, China) as the photosensitizer were used.

Comparative Example 2

Preparation of Ink Composition

As shown in Table 2 below, an ink composition was prepared using the same composition and method as in Example 2 except that ethylene glycol monobutyl ether acetate (BCsA) was used instead of diethyl succinate as the organic solvent.

Comparative Example 3

Preparation of Ink Composition

As shown in Table 2 below, an ink composition was prepared using the same composition and method as in Example 3 except that 25% by weight of butyl diglyme as the organic solvent, 3% by weight of CPI-210S (SAN-APRO, Japan) as the photopolymerization initiator and 1% by weight of DBA (KAWASAKI KASEI, Japan) as the photosensitizer were used.

Comparative Example 4

Preparation of Ink Composition

As shown in Table 2 below, an ink composition was prepared using the same composition and method as in Example 1 except that that 25% by weight of butyl diglyme as the organic solvent, 29% by weight of OXT-221 as the oxetane compound, 10% by weight of 1,4-cyclohexanedimethanol divinyl ether as the diluent, 3% by weight of CPI-210S as the photopolymerization initiator and 1% by weight of DBA as the photosensitizer were used.

Comparative Example 5

Preparation of Ink Composition

As shown in Table 2 below, an ink composition was prepared using the same composition and method as in Comparative Example 4 except that UV-692S (Tetrachem, China) was used as the photopolymerization initiator instead of CPI-210S.

Comparative Example 6

Preparation of Ink Composition

As shown in Table 2 below, an ink composition was prepared using the same composition and method as in Comparative Example 4 except that Irgacure 290 (BASF, Germany) was used as the photopolymerization initiator instead of CPI-210S.

TABLE 2

| | | Comp. Exam. 1 | Comp. Exam. 2 | Comp. Exam. 3 | Comp. Exam. 4 | Comp. Exam. 5 | Comp. Exam. 6 |
|---|---|---|---|---|---|---|---|
| Black pigment | Lactam black | 12 | 12 | 12 | 12 | 12 | 12 |
| Dispersant | Acrylic-based | 2 | 2 | 2 | 2 | 2 | 2 |
| Epoxy compound | Celloxide 2021p | 10 | 10 | 10 | 10 | 10 | 10 |
| Diluent | 1,4-cyclohexanedimethanol divinyl ether | 10 | — | — | 10 | 10 | 10 |
| | N-Butyl Glycidyl Ether | — | 5 | 5 | 5 | 5 | 5 |

TABLE 2-continued

|  |  | Comp. Exam. 1 | Comp. Exam. 2 | Comp. Exam. 3 | Comp. Exam. 4 | Comp. Exam. 5 | Comp. Exam. 6 |
|---|---|---|---|---|---|---|---|
| Oxetane compound | OXT-221 | 28 | 34 | 39 | 29 | 29 | 29 |
|  | OXT-212 | 5 | — | — | — | — | — |
| Organic solvent | Butyl diglyme | 25 | — | 25 | 25 | 25 | 25 |
|  | BCsA | — | 25 | — | — | — | — |
|  | gamma-butyrolactone | — | 6 | — | — | — | — |
| Adhesion promoter | KBM-403 | 3 | 3 | 3 | 3 | 3 | 3 |
| Photopolymerization initiator | Irgacure 550 | — | 3 | — | — | — | — |
|  | CPI-210S | — | — | 3 | 3 | — | — |
|  | UV-692S | — | — | — | — | 3 | — |
|  | Irgacure 290 | — | — | — | — | — | 3 |
|  | Irgacure 250 | 4 | — | — | — | — | — |
| Photo sensitizer | DBA | — | — | 1 | 1 | 1 | 1 |
|  | ITX | 1 | — | — | — | — | — |

Evaluation of Properties of Samples Prepared from the Ink Composition of Examples 1 to 5 and Comparative Examples 1 to 6

The ink composition prepared in Examples 1 to 5 and Comparative Examples 1 to 6 was inkjet-printed onto a square glass having a size of 50 mm in width, 50 mm in length and 0.5 μm in thickness at an optical density (OD) of 0.9 using X-rite 341C to prepare the sample. Then, the thickness, the curing sensitivity, the storage stability, the ink stability, the performance of inkjet process (idle time), the adhesion force to the bottom, the rework performance and the infrared transmittance (@ 850 nm) were evaluated. The results are shown in Tables 3 and 4 below.

The curing sensitivity was evaluated by UV energy at a tack free point at which the adhesive strength was lost using a UV LED lamp of 395 nm wavelength. Storage stability was determined by storing the ink in an oven at 35° C. and measuring the number of days over which the viscosity increased by more than 10%. The ink stability was checked by whether or not the photopolymerization initiator precipitated after ink production. For the performance of inkjet process, jetting was evaluated according to the short purge (3 s) and the idle time after wiping, while all nozzles were ejected. For the adhesion force to the bottom, a cross cut test (Specification: ASTM D3002, D3359) was carried out to measure the adhesion force, and the result was graded from 0B to 5B. The rework performance was evaluated with an abrasion & rubbing tester by, applying a load of 2 kg to wiper (CF-909) and then supplying acetone to check whether the bezel layer was removed within 20 reciprocations (speed: 30 reciprocations/min). The infrared transmittance of the sample was measured for a wavelength of 380 to 1,000 nm using a UV-VIS spectrometer, and the transmittance at 850 nm is shown in Tables 3 and 4 (transmittance of the glass itself without printing the ink composition is 100%). In the evaluation of ink stability and rework performance in the following Tables 3 and 4, the ○ means excellent, and the X means not excellent.

TABLE 3

|  | Example 1 | Example 2 | Example 3 | Example 4 | Example 5 |
|---|---|---|---|---|---|
| Optical Density | 0.9 | 0.9 | 0.9 | 0.9 | 0.9 |
| Thickness (μm) | 1.9 | 1.9 | 2.2 | 2.3 | 1.9 |
| Curingsensitivity (UV energy, mJ/cm$^2$) | 1500 | 1500 | 1500 | 1500 | 1500 |
| Storage stability (days over which the viscosity increased by more than 10% when stored at 35° C.) | 60 | 60 | 60 | 60 | 60 |
| Ink stability | ○ | ○ | ○ | ○ | ○ |
| Performance of inkjet process (idle time) | 20 min | 20 min | 20 min | 20 min | 20 min |
| Adhesion force to the bottom | 5B | 5B | 5B | 5B | 5B |
| Rework performance | ○ | ○ | ○ | ○ | ○ |
| Transmittance (@850 mm) | 80% | 80% | 80% | 80% | 80% |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Optical Density | 0.9 | 0.9 | 0.9 | 0.9 | 0.9 | 0.9 |
| Thickness (μm) | 1.9 | 1.9 | 1.9 | 1.9 | 1.9 | 1.9 |
| Curing sensitivity (UV energy, mJ/cm$^2$) | 1000 | 1500 | 5000 | 4000 | 4000 | 5000 |
| Storage stability (days over which the viscosity increased by more than 10% when stored at 35° C.) | 10 | 60 | 60 | 60 | 50 | 50 |
| Ink stability | ○ | ○ | ○ | ○ | ○ | ○ |

TABLE 4-continued

| | Comparative Example 1 | Comparative Example 2 | Comparative Example 3 | Comparative Example 4 | Comparative Example 5 | Comparative Example 6 |
|---|---|---|---|---|---|---|
| Performance of inkjet process (idle time) | 20 min | 3 min | 20 min | 20 min | 20 min | 20 min |
| Adhesion force to the bottom | 5B | 5B | 5B | 5B | 5B | 5B |
| Rework performance | ○ | ○ | ○ | ○ | ○ | ○ |
| Transmittance (@850 mm) | 80% | 80% | 80% | 80% | 80% | 80% |

Experimental Example 1

Evaluation of Thickness

Unlike Examples 1 and 2 in which the content of the lactam black pigment is 12% by weight, in the case of Example 4 in which the content of the lactam black pigment was reduced to 10% by weight, the thickness of the sample (i.e., the bezel) was slightly increased to 2.3 μm. But this thickness was 3 μm or less, which was suitable for the present invention. It was confirmed that other properties were same as those of Examples 1 and 2, so that there was no problem in reliability. And, unlike Examples 1 and 2 in which the content of the organic solvent is 25% by weight, in the case of Example 3 in which the content of the organic solvent was reduced to 20% by weight, the thickness of the sample (i.e., the bezel) was slightly increased to 2.2 μm. But this thickness was 3 μm or less, which was suitable for the present invention. It was confirmed that other properties were same as those of Examples 1 and 2, so that there was no problem in reliability.

Experimental Example 2

Evaluation of Performance of Inkjet Process and Curing Sensitivity

In the case of Examples 1 to 5 in which butyl diglyme or diethyl succinate was used as the organic solvent, the idle time was 20 minutes and the performance of inkjet was excellent. In contrast, in the case of Comparative Example 2 using ethylene glycol monobutyl ether acetate (BCsA) instead of butyl diglyme as the organic solvent, it was confirmed that the idle time was 5 minutes or less and the performance of inkjet process was insufficient.

In addition, Examples 1 to 5 using Omnicat 550 as the photopolymerization initiator exhibited excellent curing sensitivity without using a photosensitizer, whereas in Comparative Examples 3 to 6 using CPI-210S, UV-692S or Irgacure 290 instead of Omnicat 550, the curing sensitivity was not good although the photosensitizer (1 wt % DBA) was used.

Experimental Example 3

Evaluation of Storage Stability

In the case of Examples 1 to 5 using Ominicat 550 as photopolymerization initiator, excellent storage stability was shown at 60 days when it was stored at 35° C. in an oven at 10% or more. In contrast, Comparative Examples 1 and 3 to 6 using Irgacure 250, CPI-210S, UV-692S or Irgacure 290 instead of Ominicat 550 showed poor storage stability.

Experimental Example 4

Evaluation of Ink Stability

The ink compositions according to Examples 1 to 5 did not cause precipitation of the initiator after ink production, and thus showed good ink stability.

Experimental Example 5

Evaluation of Adhesion Force to the Bottom

The ink compositions according to Examples 1 to 5 using 3% by weight of KBM-403 as the adhesion promoter showed excellent adhesion at a level of 5B as measured by a cross cut test.

Experimental Example 6

Evaluation of Rework Performance

In the ink compositions according to Examples 1 to 5 using 3% by weight of KBM-403 as the adhesion promoter, it was confirmed that removal of the bezel was not easy even after 20 reciprocations.

Experimental Example 7

Evaluation of Infrared Transmission

It was confirmed that the ink compositions according to Examples 1 to 5 exhibited an infrared transmittance of 80% at 850 nm.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. An infrared transmitting ink composition for inkjet, comprising a lactam black pigment or a perylene black pigment or the combination thereof; a dispersant; an epoxy compound; an oxetane compound; a photopolymerization initiator; and an organic solvent,
    wherein the organic solvent has a boiling point of 200° C. or higher and a viscosity of 1 to 5 cP at 25° C.,
    wherein the photopolymerization initiator comprises Omnicat 550 (10-[1,1'-biphenyl]-4-yl-2-(1-methylethyl)-9-oxo-9H-thioxanthenium hexafluorophosphate).
2. The infrared transmitting ink composition for inkjet according to claim 1, wherein the organic solvent is at least one selected from the group consisting of butyl diglyme, dipropylene glycol methyl ether acetate, ethylene glycol dibutyrate, diethyl succinate, gamma-butyrolactone and ethyl caprate.

3. The infrared transmitting ink composition for inkjet according to claim 1, wherein the ink composition has a transmittance of 80% or more at a wavelength of 850 to 940 nm.

4. The infrared transmitting ink composition for inkjet according to claim 1, wherein a content of the lactam black pigment or the perylene black pigment or the combination thereof is 5 to 15% by weight based on a total weight of the ink composition.

5. The infrared transmitting ink composition for inkjet according to claim 1, wherein a content of the dispersant is 0.5 to 5% by weight based on a total weight of the ink composition.

6. The infrared transmitting ink composition for inkjet according to claim 1, wherein a content of the epoxy compound is 5 to 25% by weight based on a total weight of the ink composition.

7. The infrared transmitting ink composition for inkjet according to claim 1, wherein a content of the oxetane compound is 25 to 50% by weight based on a total weight of the ink composition.

8. The infrared transmitting ink composition for inkjet according to claim 1, wherein a content of the organic solvent is 20 to 35% by weight based on a total weight of the ink composition.

9. The infrared transmitting ink composition for inkjet according to claim 1, wherein a content of the photopolymerization initiator is 1 to 10% by weight based on a total weight of the ink composition.

10. The infrared transmitting ink composition for inkjet according to claim 1, wherein the ink composition further comprises an adhesion promoter in an amount of 1 to 5% by weight based on a total weight of the ink composition.

11. The infrared transmitting ink composition for inkjet according to claim 1, wherein the ink composition has a viscosity of 1 to 30 cP at 25° C. and adhesion force to the substrate of 4B or more in the cross cut test.

12. The infrared transmitting ink composition for inkjet according to claim 1, wherein a time point when a viscosity of the ink composition is increased by 10% or more when stored at 35° C. is 60 days or more.

13. A method for forming a bezel pattern comprising:
 a) forming a bezel pattern by inkjet printing the infrared transmitting ink composition for inkjet according to claim 1 on a substrate; and
 b) curing the bezel pattern by irradiation with radiation.

14. The method for forming a bezel pattern according to claim 13, wherein the cured bezel pattern has a thickness of 1 to 3 μm.

15. A bezel pattern manufactured by inkjet printing the infrared transmitting ink composition for inkjet according to claim 1 on a substrate.

16. A display substrate comprising the bezel pattern according to claim 15.

\* \* \* \* \*